U. C. TAINTON.
METHOD OF ROASTING ORES OR CONCENTRATES.
APPLICATION FILED APR. 1, 1918.
1,310,455. Patented July 22, 1919
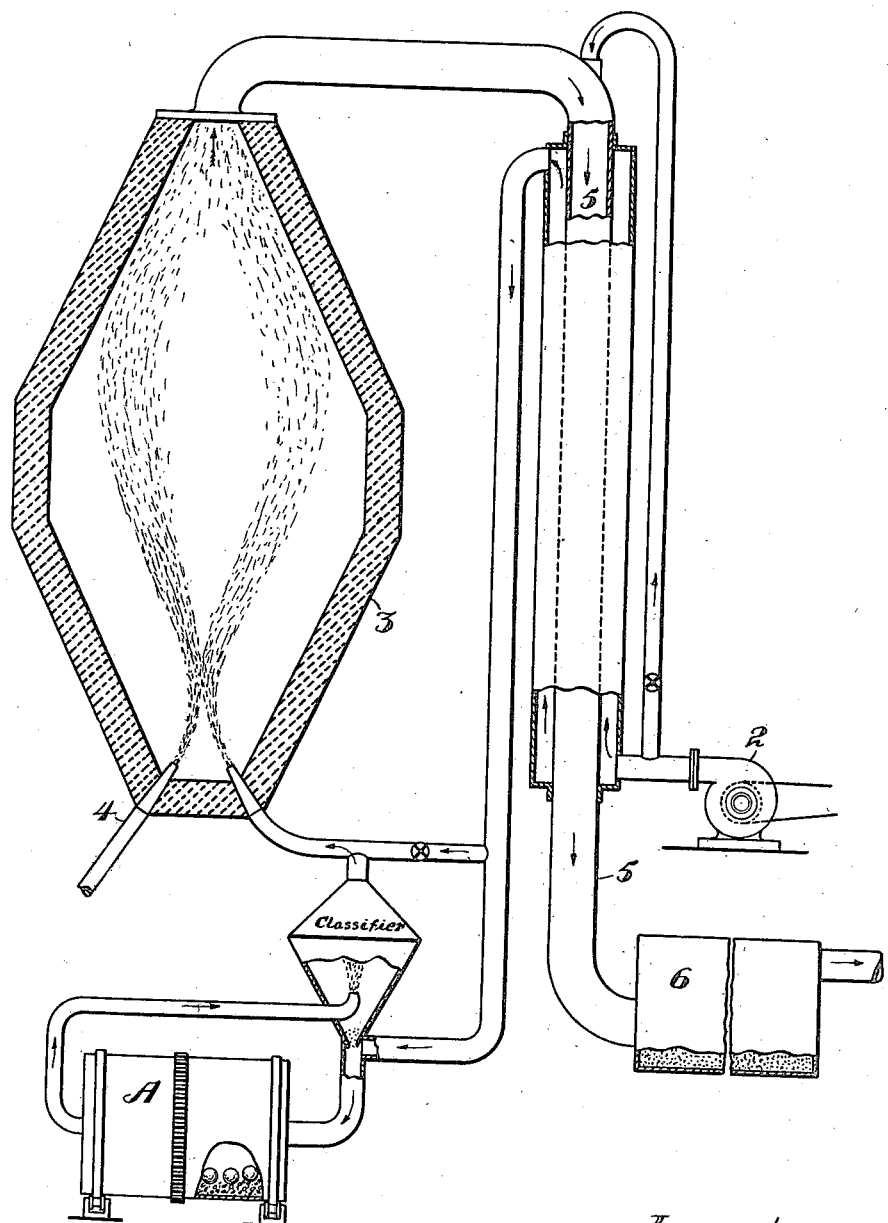
Inventor
Urlyn C. Tainton
By Strong & Townsend
Attorneys

UNITED STATES PATENT OFFICE.

URLYN C. TAINTON, OF DOORNFONTEIN, JOHANNESBURG, TRANSVAAL, UNITED SOUTH AFRICA.

METHOD OF ROASTING ORES OR CONCENTRATES.

1,310,455.     Specification of Letters Patent.     Patented July 22, 1919.

Application filed April 1, 1918. Serial No. 226,075.

*To all whom it may concern:*

Be it known that I, URLYN C. TAINTON, a subject of the King of England, and residing at Doornfontein, Johannesburg, Transvaal, United South Africa, have invented new and useful Improvements in Methods of Roasting Ores or Concentrates, of which the following is a specification.

This invention relates to a method of roasting ores or concentrates, and is intended more particularly for the roasting of zinc ores containing iron.

An apparatus suitable for the operation of the process is diagrammatically illustrated in the accompanying drawing.

Zinc ores containing iron, when roasted by ordinary methods, are comparatively wasteful, due to the fact that zinc combines with the iron and thereby forms zinc ferrate ($ZnOFe_2O_3$). This compound is formed by the contact of particles of zinc oxid with particles of ferric oxid at temperatures above or about 900° centigrade. Zinc ferrate is insoluble in dilute acids, and, therefore, when the roasted ore is to be leached with sulfuric acid as in the ordinary process of electrolytic zinc treatment, that part of the zinc which has been converted to ferrate does not dissolve and is the cause of low extractions.

In the present invention, it is sought to crush the ore sufficiently fine to effect complete separation of the zinc and iron minerals, to roast each particle individually and as far as possible without contact with the other particles, and then to cool each to a temperature at which combination will not occur before allowing contact.

To effect this, it is proposed to carry the finely divided material in a current of air during the process of roasting and to cool the gases carrying the ore before separating the ore from the gas.

In a typical case, for example, the material to be roasted is a concentrate containing zinc, iron and copper sulfids. The concentrate to be roasted is ground in a ball mill A, or other suitable apparatus, to a very fine powder for instance from 100 to 150 mesh. These fine particles are carried forward by a current of air produced by a fan 2, this being also the air to be used for combustion of the ore. If desired, this mixture of dust and air may be pre-heated before entering the furnace 3 by the heat from the issuing gases. The finely divided ore is then blown into the combustion chamber of the furnace which is maintained at a high temperature. In some cases this may be done by the heat of the burning ore alone or it may be necessary to employ auxiliary heat produced by the combustion of oil from a burner 4. When the material has a high calorific value as, for example, in the case of mixed zinc and iron sulfid, say containing 30% S or more, it is possible to burn the ore without auxiliary heat just as if it were a coal dust. To effect this result the incoming air is preheated by the heat exchange in the cooling flue, the air being heated almost to the ignition point of the iron sulfid about 500° centigrade. The air on entering the combustion chamber ignites the sulfids, and if the chamber is properly insulated no further source of heat is necessary. Even where the auxiliary heat cannot be dispensed with entirely, it can often be cut down to a very small amount, amounting in many cases simply to a kind of pilot jet or flame through which the ore passes and is thereby ignited. The furnace chamber must be of such dimensions that the particles of ore shall remain in it sufficiently long to insure complete oxidation of the sulfid. The gases then pass out of the combustion zone and are cooled in cooling flues 5 by diiution with air or other suitable means before the dust is separated from them.

This separation may be effected by any of the well-known methods, such as dust chambers 6, centrifugal separators, filter bags or electrostatic precipitation, or by any combination of these.

It is important that the speed of the gases should be sufficiently high to maintain in suspension the particles of ore so long as these are at a high temperature. By working in this way, however, a result is secured different from that obtainable in any type of roasting furnace hitherto used, as each particle of zinc ore is roasted individually and does not come into contact with any particle of iron until the temperature is below that at which combination can occur.

Having thus described my invention, what I claim and desire to secure by Letters Patent is—

1. A method of roasting zinc ores or concentrates containing iron, which consists in reducing the ore by milling or grinding to a comminuted mass, blowing said mass by means of an air blast through a roasting chamber to permit each zinc and iron particle contained in the ore or concentrates to be roasted while suspended in said blast, cooling said particles after passage through the roasting chamber, and then separating said particles from the air by permitting them to settle in a collecting chamber.

2. A method of roasting zinc ores or concentrates containing iron, which consists in separating the particles of zinc mineral from those of the iron mineral by fine grinding or milling of the material to be treated, passing said finely divided mineral particles by means of an air blast through a roasting chamber, and then cooling the individual particles while so suspended to a temperature at which the zinc oxid mineral particles will not combine with the particles of iron oxids.

3. A method of roasting complex ores or concentrates, which consists in grinding or milling the material to be treated to a fineness where separation of the minerals contained takes place, passing said finely divided mineral particles in a suspended condition through a roasting chamber and then cooling the individual mineral particles while in suspension.

4. A method of roasting complex ores or concentrates, which consists in grinding or milling the material to be treated sufficiently fine to effect substantial separation of the minerals contained, passing said finely divided mineral particles in a suspended condition by means of an air blast through a roasting chamber, and then cooling the individual mineral particles while suspended in the air blast.

In testimony whereof I have hereunto set my hand in the presence of two subscribing witnesses:

URLYN C. TAINTON.

Witnesses:
J. E. CLENNELL,
A. V. UDELL.